(12) United States Patent
Noel

(10) Patent No.: US 10,737,977 B1
(45) Date of Patent: Aug. 11, 2020

(54) METHODS FOR RECYCLING SURPLUS WATER-BASED LATEX PAINT AND AGGREGATE PRODUCTS MADE THEREFROM

(71) Applicant: Jerry Wayne Noel, Sacramento, CA (US)

(72) Inventor: Jerry Wayne Noel, Sacramento, CA (US)

( * ) Notice: Subject to any disclaimer, the term of this patent is extended or adjusted under 35 U.S.C. 154(b) by 17 days.

(21) Appl. No.: 16/243,690

(22) Filed: Jan. 9, 2019

Related U.S. Application Data

(60) Provisional application No. 62/619,529, filed on Jan. 19, 2018.

(51) Int. Cl.
*C04B 18/20* (2006.01)
*C04B 18/02* (2006.01)
*C04B 40/00* (2006.01)

(52) U.S. Cl.
CPC ............ *C04B 18/20* (2013.01); *C04B 18/021* (2013.01); *C04B 40/0032* (2013.01)

(58) Field of Classification Search
CPC .... C04B 18/20; C04B 18/021; C04B 40/0032
USPC ........................................................... 524/2
See application file for complete search history.

(56) References Cited

U.S. PATENT DOCUMENTS

2003/0213412 A1* 11/2003 Drew ...................... C04B 18/18
106/712

OTHER PUBLICATIONS

Nehdi et al (Recycling waste latex paint in concrete, Cement and Concrete Research, 33 (2003) 857-863) (Year: 2003).*
Recycling Leftover Latex Paint in Concrete With Added Value by Abdulrahman Mohammed, MESc. and Moncef L. Hehdi, PHd. P. Eng., Associate Professor.

* cited by examiner

*Primary Examiner* — Doris L Lee
(74) *Attorney, Agent, or Firm* — John P. Costello; Costello Law Corp.

(57) ABSTRACT

The invention is an aggregate made from waste water-based latex paint in one embodiment. The aggregate can be used to fill driveways, roadways, landscaping, etc., the way aggregate is always used. In another embodiment, the aggregate can be employed in a mixture to make precast concrete structures. The aggregate produced by the invention has good compressive strength characteristics, which approximate pumice, and any applications where pumice is used as an aggregate can also employ the present invention.

11 Claims, 2 Drawing Sheets

METHODS FOR RECYCLING SURPLUS WATER-BASED LATEX PAINT AND AGGREGATE PRODUCTS MADE THEREFROM

REFERENCE TO RELATED APPLICATIONS

This application claims the benefit of U.S. Provisional Patent Application No. 62/619,529. Filed on Jan. 19, 2018.

BACKGROUND OF THE DISCLOSURE

Technical Field of the Disclosure

The present invention applies to methods of recycling surplus water-based latex paint and more specifically, to a method for converting surplus water-based latex paint to an aggregate form which can be further employed in manufacturing precast concrete products.

Description of the Related Art

Surplus water-based latex paint is often left over in great quantity from commercial painting jobs; most times it is simply not economical for a commercial painting company to retain odd lots of colors from previous jobs in quantities that are insufficient to be used on a new job. As such, much of this paint is turned over to recycling companies to be disposed of, following the completion of a commercial painting job. This paint is water-based latex paint, which is typically 40-50 weight percent water, the rest being paint solids.

One method of paint recycling has been to use surplus paint in the manufacture of Portland cement. U.S. Pat. No. 5,496,404 issued to Price on Mar. 5, 1996, describes a process for utilizing waste paint by combining the waste paint with a mineral-based solid material forming an additive. This additive is then included as an ingredient in the manufacture of Portland cement with the additive being added to the cement clinker after heat treating of the raw material constituents producing the cement clinker. The invention specifies that the amount of waste paint added to Portland cement is 0.2 to 3 weight percent. Therefore, this method, while employing waste paint, only uses a small quantity in the manufacture of Portland cement.

Other prior art references advocate recycling waste paint by employing it as an ingredient of cement manufacture. A publication by A. Mohammed, M. Nehdi entitled "Recycling Leftover Latex Paint in Concrete with Added Value" (University of Western Ontario (May 30, 2007)) discloses the mixing of waste water-based latex paint with cement as a method of getting rid of waste paint. However, this reference does testing on cement-waste latex paint mixtures ranging from 5-25 weight percent (%) of the mixture. This reference advocates achieving characteristics such as flexibility and strength in the final product by managing the cement/latex paint ratio as being the most important variable to manage and not the water-cement ratio. Also, of note with this reference is that it advocates adding water-based latex paint directly to cement, wherein, the paint acts as a water-substitute. The results of this process included an increase in the flexural strength of concrete, but a decrease in the compressive strength of same. As such, the final product has limited uses.

The presently known methods of recycling waste paint by employing the waste paint in cement manufacturing suffer from the drawback that the waste paint is no more than 25 weight percent of the cement mixture. A better method wherein the waste paint comprises a higher weight percent of the cement mixture is needed to more effectively reduce the amount of waste paint existing from recycling efforts. Additionally, the compressive strength of the resulting concrete is insufficient for many industrial purposes, such as creating high-strength precast concrete products.

The foregoing reflects the state of the art of which the inventor is aware and is tendered with a view toward discharging the inventor's acknowledged duty of candor, which may be pertinent to the patentability of the present invention. It is respectfully stipulated, however, that the foregoing discussion does not teach or render obvious, singly or when considered in combination, the inventor's claimed invention.

SUMMARY OF THE DISCLOSURE

The invention, in one embodiment, is an aggregate made from waste paint. The aggregate can be used to fill driveways, roadways, landscaping, etc.; the way aggregate is always used. In another embodiment, the aggregate can be employed in a mixture to make precast cement structures. The aggregate produced by the invention has good compressive strength characteristics, which approximate pumice, and any applications where pumice is used as an aggregate can also employ the present invention.

The waste paint aggregate is created as follows:
1) Mix about 40 weight percent cement with 40-60 weight percent of waste paint and 5-15 weight percent water;
2) Work this mixture in a cement mixer;
3) Pour the mixture onto the ground;
4) Wait 2-4 months for the mixture to dry;
5) Crush dried mixture and classify into aggregate.

The second part of the invention is to employ the aggregate in precast concrete manufactured products. The precast is created as follows:
1) Take the waste paint aggregate manufactured according to the method herein and mix with 2-5 weight percent of waste paint, cement, water, and fiber mesh;
2) Mix in high range water reducer;
3) Adjust water-cement ratios to achieve a final desired strength of concrete mix for precast products;
4) Use standard mix design charts to gauge the right water-cement ratio or strength profile.

The aggregate employs 40-60 weight percent of paint, so the aggregate starts with a high percentage of waste paint as a component. In order to carry over this high weight percent of waste paint usage into the final precast concrete product, the invention requires that the water-cement ratios be managed carefully.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized, and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below. The invention will now be described with reference to the accompanying drawings which do not limit the scope and the ambit of the invention. In the following discussion that addresses a number of embodiments and applications of the present invention, reference is made to the accompanying drawings that form a part hereof, and in which is shown by way of illustrating specific embodiments in which the invention may be practiced. It is to be understood that other embodiments may be utilized, and changes may be made without departing from the scope of the present invention.

As used herein, the singular forms "a", "an" and "the" include plural references unless the context clearly dictates otherwise. "And" as used herein is interchangeably used with "or" unless expressly stated otherwise. As used herein, the term 'about" means +/−5% of the recited parameter. All embodiments of any aspect of the invention can be used in combination, unless the context clearly dictates otherwise.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "wherein", "whereas", "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

Figure 1:
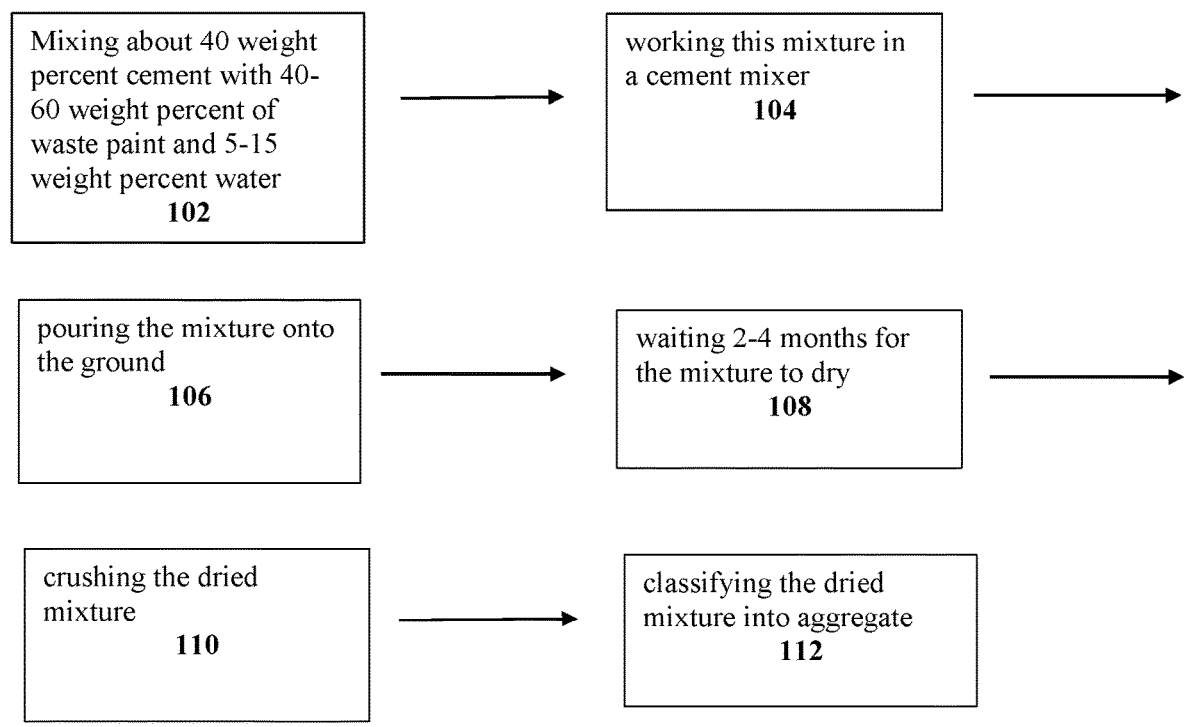
FIG. 1 is a flow chart showing the manufacturing process for the aggregate manufacture.

Referring to the drawings, and in particular, FIG. 1, the manufacture of the aggregate in accordance with the invention is shown. The aggregate manufactured according to the method described below is comprised of 40-60 weight percent of water-based waste latex paint; this high weight percent of the aggregate allows the aggregate to operate as a significant end product for recycling paint.

The aggregate is manufactured by employing the following steps in the following order:
1) Mix about 40 weight percent cement with 40-60 weight percent of waste water-based latex paint and 5-15 weight percent water; (102)
2) Work this mixture in a cement mixer;) (104)
3) Pour the mixture onto the ground; (106)
4) Wait 2-4 months for the mixture to dry; (108)
5) Crush dried mixture and classify into aggregate. (110)

When classified (112) to a ¾" aggregate, the bulk density of the aggregate is around 59 lbs./cubic foot; when classified to a ⅜" aggregate the bulk density of the aggregate is around 65 lbs./cubic foot.

The aggregate, upon being classified (112) can be used for any one of a number of purposes to which aggregate is typically employed. For example, the aggregate can be used as gravel for walkways and landscaping. Color can be added as part of the aggregate manufacturing steps to achieve a desired appearance in these landscaping applications.

The aggregate manufacture can be shortened significantly if the drying process of 2-4 months (in ambient temperatures of at least 70 degrees Fahrenheit) is significantly shortened. The inventor has discovered two major ways to shorten the drying process. The first is to employ a "High Early" compound which is combined with the wet aggregate mixture. High Early is a strength and set accelerating admixture which accelerates the set, strength and drying of the aggregate mixture. A High Early that has been found acceptable for usage with the invention is that which goes by the trademark of CEM™, manufactured by Mapei AS of Norway. A second way to shorten the drying time of the aggregate mixture is to place the mixture in a drying oven rather than pouring it on the ground in ambient temperatures of 70-degree Fahrenheit or above.

In a further embodiment the aggregate manufacture process can also incorporate by products from recycling carpet. Carpet is a major waste stream and is comprised of the carpet fiber portion and the backing portion. The carpet backing is comprised of glue and calcium carbonate; it is this glue and calcium carbonate which can be added to the aggregate manufacturing process to aid in the recycling of carpet. If these carpet components are added as an ingredient to the aggregate manufacturer, they comprise a portion of the entire weight percent of the mixture.

Figure 2:
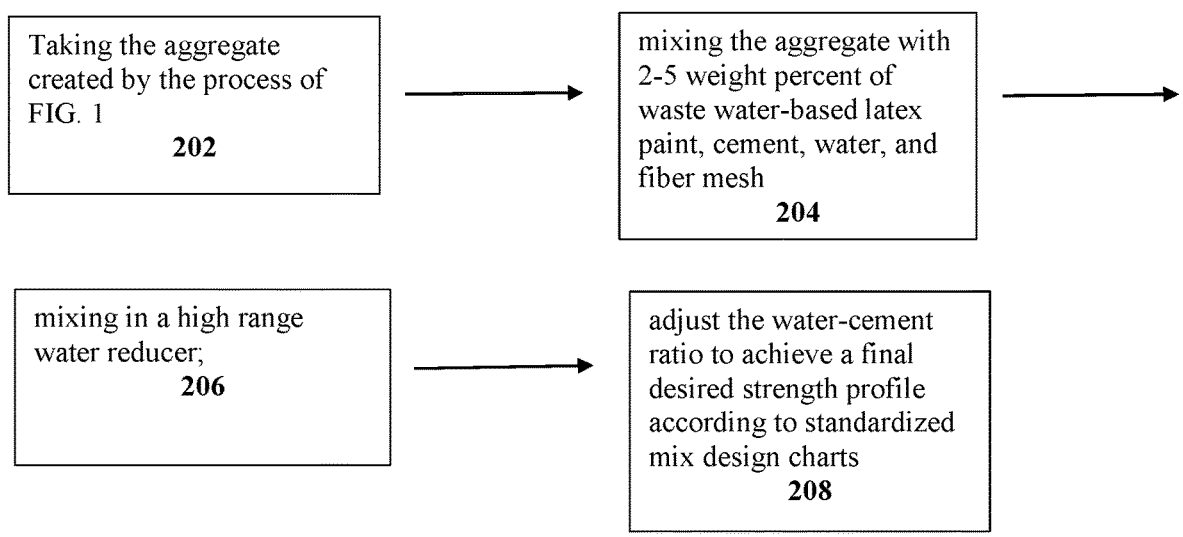
FIG. 2 is a flow chart showing the manufacturing of precast components using the aggregate product made according to the process shown in FIG. 1.

As shown in FIG. 2, the aggregate can also be crushed to a particular size classification to be used in a process for making precast concrete products. The aggregate has been crushed to achieve sieve sizes ranging from ½" to a #200 sieve size classification for use in making precast concrete products. If the aggregate is to be used in a precast application, the following steps are necessary:
1) Take aggregate crushed and classified (202) as noted above and mix with 2-5 weight percent of the following ingredients: waste paint, cement, water, and fiber mesh; (204)
2) Mix in high range water reducer; (206)
3) Adjust water-cement ratios to achieve final desired strength profile of concrete mix for precast products; (208)
4) Use mix design charts to gauge right strength profile. (208)

Regarding steps 3 and 4 of the precast process, standard mix-design charts must be used. These are standard mix design charts well known in the precast concrete industry.

Aggregate Batch Example:

The first step in the aggregate creation requires that a mix of about 40 weight percent cement, 40-60 weight percent of water-based latex paint and 5-15 weight percent water be created. The weight percentages must add up to 100 weight percent in the end. Following these percentages, a mixture of 1200 lbs. Type III cement is mixed with 1800 lbs. of water-based latex paint and 300 lbs. of water. The yield from this is 13.5 cubic feet of aggregate mixture per batch. This batch is then worked in a cement mixture and poured onto the ground in a drying area, which can be in an outdoor drying area, preferably in ambient temperatures above 70 degrees Fahrenheit. A drying period of between 2-4 months is optimum. Once dried, the dry aggregate mix is broken into aggregate and classified in sizes. Classification sizes of ¾" to ⅜" are used for landscaping applications. A classification size of ⅛" has been found to be useful in road patching applications. Classification sizes as small as #200 mesh render a powdery consistency which is best used in precast concrete manufacturing as described in the precast manufacturing embodiment herein. The inventor has made precast products including car stops and stepping stones using this process.

The aggregate possesses desirable strength characteristics similar to pumice aggregate. Table 1 illustrates some of the material characteristics for 3/8" aggregate:

TABLE I

Material Description

3/8" Latex Paint Chips
Atterberg Limits

| PL = | LL = | PI = |
|---|---|---|
| | Coefficients | |
| $D_{90}$ = 6.2555 | $D_{85}$ = 5 5488 | $D_{60}$ = 3.5739 |
| $D_{50}$ = 3.0391 | $D_{30}$ = 1.9411 | $D_{15}$ = 0.2029 |
| $D_{10}$ = | $C_u$ = | $C_c$ = |
| | Classification | |
| USCS = | | AASHTO = |
| | Remarks | |

Cleanness Value (57) Durability Index (88) SE (100)
Coarse - Specific Gravity (1.42) Absorption (22.0)
Fine- Specific Gravity (1.39) Absorption (23.1)

The aggregate, if used in manufacturing precast products, does not result in decreased compressive strength and is therefore a strong candidate for use in most precast applications. Also, the pumice-like qualities of the aggregate make it a lighter weight option than other standard gravel types. The aggregate of the present invention therefore may result in lighter weight precast products.

The inventive aggregate manufacturing process allows for large quantities of waste latex paint to be used (40-60 weight percent of each batch) and also allows for the usage of less cement (around 40 weigh percent of each batch); cement being the most expensive component of the aggregate. Waste latex paint is an environmental recyclable in many locations of the United States and recyclers are paid tipping fees to take the paint and find out ways to use it in a recycling fashion. The inventive aggregate manufacturing process allows a waste stream (water-based latex paint) to be converted to a value-added product in the form of aggregate, which can be further used in the manufacturing of precast concrete structures. The inventive process is believed to be the first one where waste water-based latex paint is converted to useful aggregate which has appropriate strength and weight characteristics for usage in making precast concrete structures.

The foregoing description of the preferred embodiments of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. A process for making aggregate from waste water-based latex paint, the process comprising the steps of:
   1) mixing about 40 weight percent cement with 40-60 weight percent of waste paint and 5-15 weight percent water;
   2) working this mixture in a cement mixer;
   3) pouring the mixture onto the ground;
   4) waiting 2-4 months for the mixture to dry;
   5) crushing the dried mixture; and
   6) classifying the dried mixture into aggregate.

2. An aggregate product made by the process of claim 1.

3. A process for making aggregate from waste water-based latex paint, the process comprising the steps of:
   1) mixing about 40 weight percent cement with 40-60 weight percent of waste paint and 5-15 weight percent water;
   2) working this mixture in a cement mixer;
   3) drying the mixture;
   4) crushing the dried mixture; and
   5) classifying the dried mixture into aggregate.

4. The process for making aggregate from waste water-based latex paint as recited in claim 3, wherein the drying step further comprises adding a High Early component to the mixture.

5. The process for making aggregate from waste water-based latex paint as recited in claim 3, wherein the drying step further comprises transferring the mixture to a drying oven.

6. The process for making aggregate from waste water-based latex paint as recited in claim 3, further comprising the step of mixing a weight percent of recycled carpet backing into the cement mixture.

7. The process for making aggregate from waste water-based latex paint as recited in claim 3, wherein the drying step further comprises pouring the mixture onto the ground and waiting 2-4 months for the mixture to dry.

8. The process for making aggregate from waste water-based latex paint as recited in claim 7, wherein the ambient temperature is maintained at a temperature of at least 70 degrees Fahrenheit throughout the drying time of 2-4 months.

9. An aggregate product made by the process of claim 3.

10. The aggregate product as recited in claim 9, where said aggregate is sized in a range of ½ to #200 sieve size.

11. A process for employing the aggregate made by the process of claim 1 or claim 3 to make precast concrete structures, the process comprising the steps of:
   1) taking the aggregate created by the process of claim 1 or claim 3;
   2) mixing the aggregate with 2-5 weight percent of waste water-based latex paint, cement, water, and fiber mesh;
   3) mixing in a high range water reducer;
   4) adjusting the water-cement ratio to achieve a final desired strength profile according to standardized mix design charts.

\* \* \* \* \*